Nov. 11, 1958 J. H. EVANS 2,860,245

WIDE-RANGE SWEEPING OSCILLATORS

Filed Dec. 1, 1954 2 Sheets-Sheet 1

INVENTOR
John H. Evans
BY
Ralph B. Stewart
ATTORNEY

Nov. 11, 1958 J. H. EVANS 2,860,245
WIDE-RANGE SWEEPING OSCILLATORS
Filed Dec. 1, 1954 2 Sheets-Sheet 2

INVENTOR
John H. Evans
BY Ralph B. Stewart
ATTORNEY

United States Patent Office 2,860,245

Patented Nov. 11, 1958

2,860,245

WIDE-RANGE SWEEPING OSCILLATORS

John Harold Evans, Dartmouth, Nova Scotia, Canada, assignor to A. C. Cossor Limited, London, England Application December 1, 1954, Serial No. 472,450

Claims priority, application Great Britain December 9, 1953

5 Claims. (Cl. 250—36)

Figure 1:
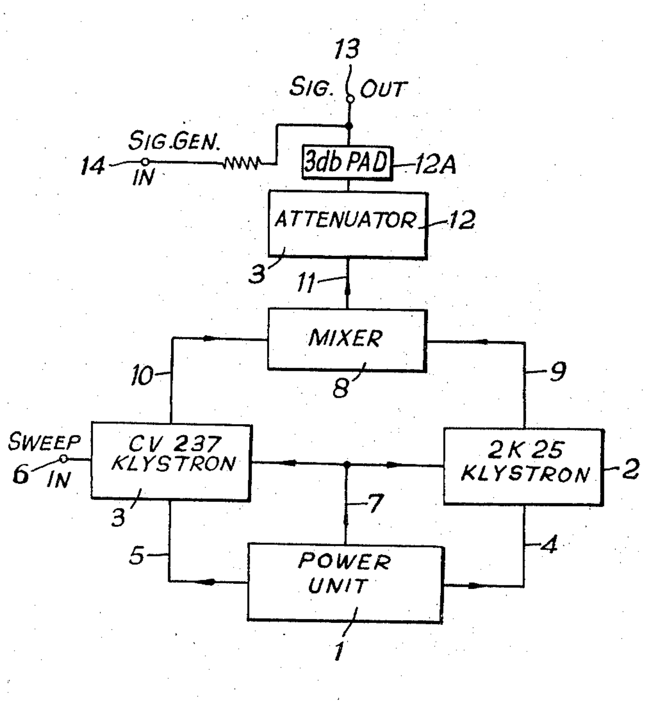

The present invention relates to wide-range sweeping oscillators, that is to say oscillators whose frequency is, in operation, caused to vary cyclically over a frequency range of some megacycles per second (mc./s.).

Such oscillators are required for testing equipment such as radar signal amplifiers and television signal amplifiers.

In such amplifiers there is included one or more stages which are required to pass signals whose frequencies extend over a wide range. In examining the characteristics of such stages, for example by means of an oscilloscope, there is required, for application to the amplifier stages, an oscillation whose frequency varies cyclically over the whole of the range which the amplifier stages are required to pass.

In some radar equipment this range may be as much as 50 mc./s.

On pages 112 to 115 of the periodical Electronics, published by McGraw-Hill Publishing Company Inc., New York, in August 1947 there is described a wide-range sweeping oscillator comprising two self-oscillating reflex klystrons. The two klystrons are of identical nominal frequencies (10,000 mc./s) and one is arranged to have its frequency varied cyclically by means of a modulating voltage of sawtooth wave form.

The outputs from the two klystrons are applied to a crystal mixer and beats appearing in the output circuit of the crystal mixer are employed as output oscillations for use in testing equipment such as radar equipment.

It is pointed out, however, on page 112 column one that the maximum frequency excursion per sweep is 40 mc./s. Thus where amplifier stages having band-widths in excess of 40 mc./s. are to be tested the apparatus described in the aforesaid periodical is not entirely satisfactory.

The principal object of the present invention is to provide an improved wide-range sweeping oscillator in which the maximum frequency excursion per sweep can be substantially in excess of 40 mc./s.

According to the present invention a wide-range sweeping oscillator comprises a radio-frequency oscillator adapted to generate oscillations of a frequency $f$, a second radio-frequency oscillator adapted to generate oscillations of a frequency of approximately $nf$ where $n$ is an integer greater than unity, means for causing the frequency $f$ of the first said oscillation to be varied cyclically, and means for applying oscillations from the two oscillators to a mixer device adapted to produce therefrom an output in the form of beats between the $n$th harmonic of the oscillations generated by the first said oscillator and the fundamental frequency of the second oscillator. Thus if $n=3$ and the excursions in the frequency of the first said oscillator are $\Delta f$ the excursions in the frequency of the beats is $3\Delta f$. It is because of this multiplication of the excursions that sweeps substantially in excess of 40 mc./s. can be achieved.

The oscillators are preferably klystrons of the self-oscillating type whose frequencies can be varied by means of a control voltage applied to a control electrode. Reflex klystrons are particularly suitable. Where $f$ has a value of about 3000 mc./s. and $nf$ a value of about 9000 mc./s. it has been found possible readily to produce sweeps of up to 100 mc./s. in the frequency of the beats. The beats selected for application to the output of the apparatus will usually be of frequencies equal to the difference between the $n$th harmonic of the first said oscillator and the fundamental frequency of the second oscillator. In some circumstances, however, the sum and not the difference of these frequencies may be required. The frequency of a self-oscillating klystron is determined not only by the physical construction of the resonant cavity associated therewith but in addition by the potential of the repeller electrode therein. It is the limit of the frequency-shift from resonance that can be achieved by repeller voltage variation that determines the maximum sweep in the oscillator described in the aforesaid periodical. In the present invention the only limit is that imposed by practical considerations concerning the use of high order harmonics.

Figure 2:
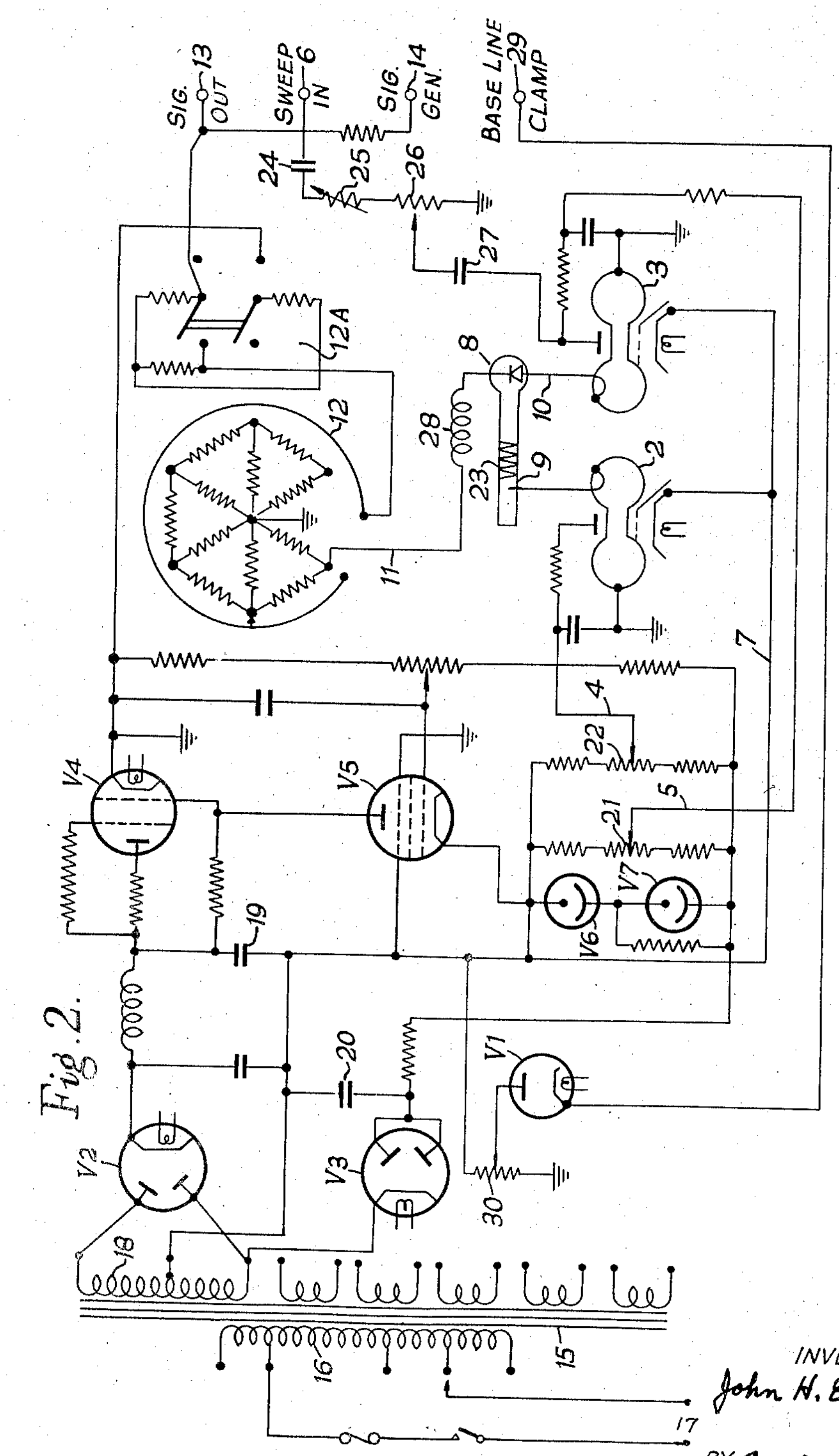

The invention will now be described by way of example with reference to the accompanying drawings, in which Fig. 1 is a block schematic diagram of one embodiment of the invention, and Fig. 2 is a circuit diagram of the embodiment shown in block schematic form in Fig. 1.

In Fig. 1, two self-oscillating reflex klystrons 2 and 3 are supplied with power from a power unit 1. The klystron 2 generates oscillations of nominal frequency 9000 mc./s. and the klystron 3 generates oscillations of nominal frequency 3000 mc/s. From a terminal 6 there is applied to the klystron 3 an oscillation of sawtooth waveform at say 50 c./s. This oscillation is applied to vary the frequency of the oscillations generated by the klystron 3 in sawtooth fashion.

The cyclically-varying output from the klystron 3 and the fixed-frequency output from the klystron 2 are applied to a mixer 8 which is conveniently a crystal mixer of known kind. The crystal generates harmonics of the oscillations applied thereto from the 3000 mc./s. klystron 3 and the beats between the third harmonic of the oscillations generated by the klystron 3 and the fundamental frequency of the oscillations generated by the klystron 2 are used as the output of the apparatus.

The beats are applied to an output terminal 13 by way of a main attenuator 12 providing relatively coarse adjustment of amplitudes and a further attenuator 12A providing relatively fine adjustment of amplitude.

By adjustment of the centre frequency of the klystron 3 and the amplitude of the sawtooth control voltage the output oscillation can be made to sweep between the values 5 mc./s. and 100 mc./s. Frequencies appreciably lower than 5 mc./s. have been found difficult to achieve in view of the tendency of the klystrons to lock into exact harmonic relationship when the difference between the frequency of the third harmonic of the oscillator 3 and the fundamental frequency of the oscillator 2 is less than about 5 mc./s.

Referring now to Fig. 2, this is a circuit diagram of the embodiment shown in block schematic form in Fig. 1. The power supply unit 1 of Fig. 1 comprises a transformer 15 whose primary winding 16 is supplied with 50 c./s/ A. C. from terminals 17. A centre-tapped secondary winding is connected to a full-wave rectifier $V_2$ in conventional fashion and the smoothed output from this rectifier appears across a capacitor 19 the lower plate in the drawing being negative. The potential of the lower plate of the capacitor 19 is stabilised at —300 volts relatively to earth by means of a conventional stabilising circuit comprising valves $V_4$ and $V_5$. A second rectifier $V_3$ is connected in conventional manner to rectify the voltage appearing between the centre tap on the winding 18 and the lower terminal of the winding as seen in the drawing. The rectified output from the rectifier $V_3$ appears across a capacitor 20 and the lower plate in the drawing of capacitor 20 takes up a potential of —600 volts.

Associated with the rectifier $V_3$ and capacitor 20 is a conventional neon tube stabiliser comprising two neon tubes $V_6$ and $V_7$. Connected across the tubes $V_6$ and $V_7$ are two potentiometers 21 and 22, the wiper of the potentiometer 21 being connected to a lead 5 also shown in Fig. 1 and the wiper of the potentiometer 22 being connected to a lead 4 also shown in Fig. 1. The wiper of the potentiometer 21 is adjusted until the potential of the lead 5 is —450 volts which determines the centre frequency of the klystron 3 to the repeller of which the lead 5 is connected as shown.

The upper plate of the capacitor 20 and the lower plate of capacitor 19 which are strapped together and carry a potential of —300 volts as previously explained are connected by means of a lead 7 also shown in Fig. 1 to the cathode of the klystrons 2 and 3 as shown.

The wiper of the potentiometer 22 is provided merely to enable the frequency of the klystron 2 to be preset. A mechanical tuning device associated with the klystron 2 may alternatively or in addition be employed.

The output of the klystron 2 is applied to the crystal mixer 8 through a wave guide 9 which contains an attenuator shown schematically at 23. The output of the klystron 3 is applied through a coaxial cable 10 to the crystal mixer 8. The bias automatically derived from the fundamental component of the oscillations applied to the crystal from the klystron 3 ensures that the rectifier is operated on the portion of the mixer characteristic best suited for mixing and providing substantially linear output.

For the purpose of causing the frequency of the klystron 3 to be varied cyclically the sawtooth control voltage at terminal 6 is applied through a capacitor 24, resistors 25 and 26 and further capacitor 27 to the repeller of the klystron 3 as shown. The resistor 25 and the connecting point to resistor 26 are variable as indicated in the drawing for the purpose of enabling the range of sweep to be varied.

The output of the mixer 8 contains a choke shown schematically at 28. Although the choke is shown schematically at 28 it will be understood by those skilled in the art that it may be provided by suitably dimensioning the waveguide in the mixer. The choke prevents the transmission from the mixer 8 to the attenuator 12 of beats of frequencies equal to the sum of the 3rd harmonic of the oscillations generated by the klystron 3 and the fundamental frequency of the oscillations generated by the klystron 2.

It will be seen that the attenuator 12 has six positions and the attenuator 12A has three positions.

In applying the embodiment of Fig. 2 to test an amplifier or other circuit in conjunction with an oscilloscope it is necessary to supply to the oscilloscope a reference voltage for application to deflecting plates of the oscilloscope. This datum potential is provided at the terminal by means of a diode $V_1$ and potentiometer 30. The resistance element of the potentiometer is connected between earth and the lead 7 which it will be remembered carries a stabilised potential of —300 volts. The anode of the diode is connected to the wiper of the potentiometer and the cathode to the terminal 29. By adjustment of the wiper of the potentiometer 30 the reference potential at the terminal 29 can be varied to suit requirements.

The klystron 2 may conveniently be of the type known as 2K25. The klystron 3 may conveniently be of the type known as CV237.

The attenuator 12 may conveniently provide attenuation in steps each of 10 db and the attenuator 12A in steps of 3 db each.

For calibration purposes when using the embodiment of Fig. 2 a frequency calibration oscillation generator may be connected to the terminal 14.

I claim:

1. A wide-range, sweep-frequency oscillation supply system comprising, a radio-frequency oscillator for generating oscillations of a frequency $f$ having a harmonic component of a frequency $nf$, where $n$ is an integer greater than unity, a second radio-frequency oscillator for generating oscillations of a frequency of approximately $nf$, cyclically operating means controlling said first oscillator to vary its frequency about the frequency $f$ in repeated cycles recurring at regular intervals, a mixer circuit, means for applying oscillations from the two oscillators to said mixer circuit to produce in said circuit beat oscillations of cyclically varying frequency resulting from the beating of the $n$th harmonic of the first said oscillator with the fundamental frequency of the second oscillator, and an oscillation work circuit energized by the varying frequency beat oscillations produced in said mixer circuit.

2. An oscillator system according to claim 1, wherein at least the first said oscillator is a klystron of the self-oscillating reflex type.

3. An oscillator system according to claim 1 wherein said mixer circuit includes a crystal mixer.

4. An oscillator system according to claim 3, comprising means providing a bias for the crystal from the energy of the fundamental component of the oscillations applied to the mixer circuit from the first said oscillator to effect operation of the crystal on a portion of its characteristic best suited for mixing and providing substantially linear output.

5. An oscillator system according to claim 1 and including filter means for suppressing in said mixer circuit the sum-frequency beat-oscillations, whereby the frequencies of the said beats supplied to said work circuit are equal to the difference between the frequencies of the $n$th harmonic of the oscillations generated by the first said oscillator and the fundamental frequency of the second oscillator.

References Cited in the file of this patent

UNITED STATES PATENTS

| | | |
|---|---|---|
| 2,363,835 | Crosby | Nov. 28, 1944 |
| 2,614,214 | Perlow et al. | Oct. 14, 1952 |
| 2,616,037 | Wheeler et al. | Oct. 28, 1952 |

OTHER REFERENCES

"Wide Range Sweeping Oscillator," in Electronics, pages 112–115, August 1947.